United States Patent [19]

Makowski et al.

[11] 4,210,568
[45] Jul. 1, 1980

[54] PLASTICIZATION OF NEUTRALIZED SULFONATED ELASTOMERIC POLYMER WITH ORGANIC CARBAMATES

[75] Inventors: Henry S. Makowski, Scotch Plains; Robert D. Lundberg, Bridgewater; Robert R. Klein, Berkley Heights, all of N.J.

[73] Assignee: Exxon Research & Engineering Co., Florham Park, N.J.

[21] Appl. No.: 898,465

[22] Filed: Apr. 20, 1978

[51] Int. Cl.$^2$ ............................................... C08K 5/16
[52] U.S. Cl. ............................ 260/32.4; 260/326 A; 260/32.6 PQ
[58] Field of Search ............ 260/32.4, 79.3 R, 23.7 M, 260/32.6 PQ, 32.6 H

[56] References Cited

U.S. PATENT DOCUMENTS

| | | | |
|---|---|---|---|
| 3,244,659 | 4/1966 | Hill, Jr. | 260/32.4 |
| 3,540,904 | 11/1970 | Sears | 260/32.4 |
| 3,642,728 | 2/1972 | Cantor | 526/14 |
| 3,847,854 | 11/1974 | Carter et al. | 260/30.4 R |
| 3,870,841 | 3/1975 | Makowski et al. | 260/23.7 M |
| 4,118,359 | 10/1978 | Brenner | 260/30.8 R |
| 4,118,362 | 10/1978 | Makowski et al. | 260/32.6 A |
| 4,131,587 | 12/1978 | Brenner | 260/32.6 A |

Primary Examiner—Joseph L. Schofer
Assistant Examiner—Peter F. Kulkosky
Attorney, Agent, or Firm—Richard E. Nanfeldt

[57] ABSTRACT

This invention relates to improved polymeric compositions of metal, amine and ammonium neutralized sulfonated polymers which are preferentially plasticized with an N-substituted organic carbamate at a minimum critical concentration level of at least 1 part by weight based on 100 parts by weight of the neutralized polymer, wherein N-substituted organic carbamate has the general formula selected from the group of:

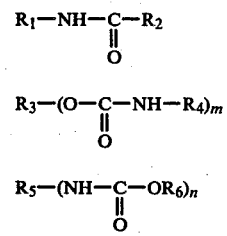

wherein $R_1$, and $R_2$ are normal or branched chain alkyl, cycloalkyl, aryl, alkaryl, or arylalkyl groups such as ethyl, butyl, octadecyl, behenyl, phenyl, benzyl, and dodecylphenyl and $R_4$ and $R_6$ and either $R_1$ or $R_2$ must be a long chain, preferably linear, saturated group containing from about 10 to about 50 carbon atoms and $R_3$ and $R_5$ are di, tri, or tetrafunctional aliphatic, cycloaliphatic, aryl or alkaryl groups and m is 2, 3, or 4 and n is 2, 3 or 4.

56 Claims, No Drawings

PLASTICIZATION OF NEUTRALIZED SULFONATED ELASTOMERIC POLYMER WITH ORGANIC CARBAMATES

BACKGROUND OF THE INVENTION

1. Field of the Invention

This invention relates to improved polymeric compositions of metal, amine and ammonium neutralized sulfonated polymers which are preferentially plasticized with an N-substituted organic carbamate at a minimum critical concentration level of at least 1 part by weight based on 100 parts by weight of the neutralized polymer, wherein N-substituted organic carbamate has the general formula selected from the group of:

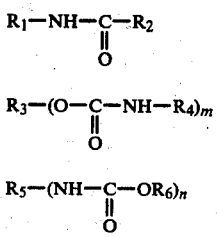

wherein $R_1$, and $R_2$ are normal or branched chain alkyl, cycloalkyl, aryl, alkaryl or arylalkyl groups such as ethyl, butyl, octadecyl, behenyl, phenyl, benzyl and dodecylphenyl and $R_4$ and $R_6$ and either $R_1$ or $R_2$ must be a long chain, preferably linear, saturated group containing from about 10 to about 50 carbon atoms and $R_3$ and $R_5$ are di, tri, or tetrafunctional aliphatic, cycloaliphatic, aryl or alkaryl groups and m is 2, 3 or 4 and n is 2, 3, or 4.

2. Description of the Prior Art

Recently a new class of thermoelastic sulfonated polymers has been described in a number of U.S. patents. These sulfonated polymers are derived from polymeric materials having olefinic unsaturation, especially elastomeric polymers such as Butyl and EPDM rubbers. U.S. Pat. No. 3,642,728 herein incorporated by reference, clearly teaches a method of selective sulfonation of olefinic unsaturation sites of an elastomeric polymer to form an acid form of a sulfonated elastomeric polymer. The olefinic sites of the elastomeric polymer are sulfonated by means of a complex of a sulfur trioxide donor and a Lewis base. The $SO_3H$ groups of the sulfonated elastomer can be readily neutralized with a basic material to form an ionically crosslinked elastomer having substantially improved physical properties over an unsulfonated elastomer at room temperature. However, these ionically crosslinked elastomers may be processed like conventional thermoplastics at elevated temperatures under a shear force in the presence of selected preferential plasticizers which dissipate the ionic associations at the elevated temperatures thereby creating a reprocessable elastomer.

The basic materials used as neutralizing agents are selected from organic amines or basic materials selected from Groups I, II, III, IV, V, VIB, VIIB and VIII and mixtures thereof of the Periodic Table of Elements. Although these sulfonated elastomeric polymers prepared by the process of U.S. Pat. No. 3,642,728 are readily usable in a certain number of limited applications, they are not as readily adaptable for the manufacture of an injection moldable elastomeric article such as footwear as are the improved compositions of the present invention, wherein both improved physical and rheological properties are realized.

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the acid form of the sulfonated elastomeric polymers are organic amines. The resultant ionically crosslinked sulfonated elastomers prepared by this process do not exhibit both the improved physical and rheological properties of the compositions of the present invention.

U.S. Pat. No. 3,870,841, herein incorporated by reference, teaches a method of plasticization of the polymeric backbone of a neutralized sulfonated plastic polymer by means of a polymer chain plasticizer which is a liquid compound having a boiling point of at least about 120° F. The polymer chain plasticizer is selected from a dialkyl phthalate, a process oil or an organic acid ester. Additionally, a domain plasticizer can be incorporated into the composition, wherein the domain plasticizer reversibly disrupts the association of the sulfonate groups at a temperature of forming. The compositions formed by the process of U.S. Pat. No. 3,870,841 are not as suitable for the manufacture of high performance elastomeric articles such as footwear formed by an injection molding process as are the compositions of the present invention.

U.S. Pat. No. 3,847,854, teaches a method of improving the processability of neutralized sulfonated elastomeric polymers by the addition of a preferential plasticizer which has at leat one functional constituent which exhibits a bond moment whose absolute value is at least 0.6 Debye, and must be a liquid at the desired processing temperature of the neutralized sulfonated elastomeric polymer.

The concentrations of the non-volatile plasticizers are limited to an upper concentration of 6–7 parts by weight because with the metal neutralized sulfonated elastomers of this invention, there would be an adverse plasticization of the polymeric backbone. This invention fails to teach, imply or infer the use of an N-substituted organic carbamate as a preferential plasticizer at any concentration; nor does not recognize that only amides of clearly defined structure are operative. The inventive concept of the present invention clearly teaches the use of N-substituted organic carbamates as a preferential plasticizer at a concentration level of at least about 1 wt. % in order to achieve not only improvements in rheological properties but also improvements in physical properties.

Copending application, U.S. Ser. No. 855,554 by H. S. Makowski and D. Brenner, teaches the use of long chain aliphatic organic amides as preferential plasticizers for metal neutralized sulfonated EPDM terpolymers and copending application, U.S. Ser. No. 855,553 by H. S. Makowski and D. Brenner teaches the use of zinc stearate as a preferential plasticizer for metal neutralized sulfonated EPDM terpolymers. These two applications fail to teach, infer or imply the use of N-substituted organic carbamates as preferential plasticizers for metal neutralized sulfonated polymers.

SUMMARY OF THE INVENTION

The present invention relates to improved compositions of metal neutralized sulfonated polymers being preferentially plasticized with about 1 to about 75 parts by weight of an N-substituted organic carbamate based on 100 parts by weight of the metal neutralized polymer, more preferably about 7 to about 50 and most preferably about 10 to about 30. These compositions have both improved physical and rheological properties previously simultaneously unattainable by the teachings of the prior art. The compositions of the present invention are readily processed due to their superior rheological properties on conventional plastic fabrication equipment into high performance elastomeric and thermoplastic articles such as garden hose or elastomeric footwear.

Accordingly, it is an object of our present instant invention to provide unique and novel compositions of metal, amine and ammonium neutralized sulfonated polymers being preferentially plasticized with an N-substituted organic carbamate thereby providing high performance elastomeric and thermoplastic articles which can be formed on conventional plastic fabricating equipment, wherein the compositions can be optionally modified with fillers, extender oils or polyolefinic thermoplastics and mixtures thereof.

GENERAL DESCRIPTION

This present invention relates to unique and novel elastomeric compositions of a metal, amine or ammonium neutralized sulfonated polymer, being preferentially plasticized with an N-substituted organic carbamate wherein the compositions exhibit not only a substantial improvement in flow properties but unexpected and substantial improvements in physical properties thereby providing high performance elastomeric articles. Thus, by the addition of high concentrations of specific N-substituted organic carbamates essentially intractable sulfonated polymer can be made to process readily in conventional molding or extrusion operations.

The metal, amine and ammonium neutralized sulfonated polymers of this present instant invention are derived from unsaturated polymers which include low unsaturated elastomeric polymers such as Butyl rubber, EPDM terpolymers and other polymers such as polypentenamer, polystyrene and polyethylene.

The expression "Butyl rubber" as employed in the specification and claims is intended to include copolymers made from a polymerization reaction mixture having therein from 70 to 99.5% by weight of an isoolefin which has about 4 to about 7 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin.

Butyl rubber generally has a Staudinger molecular weight of about 20,000 to about 500,000, preferably about 25,000 to about 400,000 especially about 100,000 to about 400,000 and a Wijs Iodine No. of about 0.5 to 50, preferably 1 to 15. The preparation of Butyl rubber is described in U.S. Pat. No. 2,356,128 which is incorporated herein by reference.

For the purposes of this invention, the Butyl rubber may have incorporated therein from about 0.2 to 10% of combined multiolefin; preferably about 0.5 to about 6%; more preferably about 1 to about 4%, e.g. 2%.

Illustrative of such a Butyl rubber is Exxon Butyl 365 (Exxon Chemical Co.), having a mole percent unsaturation of about 2.0% and a Mooney viscosity (ML, 1+8, 212° F.) of about 40–50.

Low molecular weight Butyl rubbers, i.e. Butyl rubbers having a viscosity average molecular weight of about 5,000 to 85,000 and a mole percent unsaturation of about 1 to about 5% may be sulfonated to produce the polymers useful in this invention. Preferably, these polymers have a viscosity average molecular weight of about 25,000 to about 60,000.

The EPDM terpolymers are low unsaturated polymers having about 1 to about 10.0 wt. % olefinic unsaturation, more preferably about 2 to about 8, most preferably about 3 to 7 defined according to the definition as found in ASTM-D-1418-64 and is intended to mean terpolymers containing ethylene and propylene in the backbone and a diene in the side chain. Illustrative methods for producing these terpolymers are found in U.S. Pat. No. 3,280,082, British Patent No. 1,030,289 and French Patent No. 1,386,600, which are incorporated herein by reference. The preferred polymers contain about 40 to about 80 wt. % ethylene and about 1 to about 10 wt. % of a diene monomer, the balance of the polymer being propylene. Preferably, the polymer contains about 45 to about 75 wt. % ethylene, e.g. 50 wt. % and about 2.6 to about 8.0 wt. % diene monomer, e.g. 5.0 wt. %. The diene monomer is preferably a nonconjugated diene.

Illustrative of these nonconjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene, and methyl tetrahydroindene.

A typical EPDM is Vistalon 2504 (Exxon Chemical Co.) a terpolymer having a Mooney viscosity (ML, 1+8, 212° F.) of about 40 and having an ethylene content of about 50 wt. % and a 5-ethylidene-2-norbornene content of about 5.0 wt. %. The $\overline{M}n$ of Vistalon 2504 is about 47,000, the $\overline{M}v$ is about 145,000 and the $\overline{M}w$ is about 174,000.

Another EPDM terpolymer Vistalon 2504-20 is derived from V-2504 (Exxon Chemical Co.) by a controlled extrusion process, wherein the resultant Mooney viscosity at 212° F. is about 20. The $\overline{M}n$ of Vistalon 2504-20 is about 26,000, the $\overline{M}v$ is about 90,000 and the $\overline{M}w$ is about 125,000.

Nordel 1320 (DuPont) is another terpolymer having a Mooney viscosity at 212° F. of about 25 and having about 53 wt. % of ethylene, about 3.5 wt. % of 1,4-hexadiene, and about 43.5 wt. % of propylene.

The EPDM terpolymers of this invention have a number average molecular weight ($\overline{M}n$) of about 10,000 to about 200,000; more preferably of about 15,000 to about 100,000; most preferably of about 20,000 to about 60,000. The Mooney viscosity (ML, 1+8, 212° F.) of the EPDM terpolymer is about 5 to about 60, more preferably about 10 to about 50, and most preferably about 15 to about 40. The $\overline{M}v$ of the EPDM terpolymer is preferably below about 350,000 and more preferably below about 300,000. The $\overline{M}w$ of the EPDM terpolymer is preferably below about 500,000 and more preferably below about 350,000.

The polyvinyl aromatic thermoplastic resins of the present invention are selected from the group consisting essentially of polystyrene, polyvinyltoluene, poly-t-butylstyrene, polychlorostyrene, polyalpha-methyl styrene or co- or terpolymers of the aforementioned with acrylonitrile or vinyl toluene.

The polyvinyl aromatic thermoplastics suitable for use in the practice of the invention have a glass transition temperature from about 90° C. to about 150° C., more preferably about 90° C. to about 140° C. and most preferably about 90° C. to about 120° C. These polyvinyl aromatic resins have a weight average molecular weight of about 5,000 to about 500,000, more preferably about 20,000 to about 350,000 and most preferably about 90,000 to about 300,000. These base polyvinyl aromatic thermoplastic resins can be prepared directly by any of the known polymerization processes. The term "thermoplastic" is used in its conventional sense to mean a substantially rigid (flexus modulus >10,000 psi) material capable of retaining the ability to flow at elevated temperatures for relatively long times.

The preferred polystyrene thermoplastic resin is a homopolymer of styrene having a number average molecular weight of about 180,000, and an intrinsic viscosity in toluene of about 0.8. These polymers are widely available commercially in large volume. A suitable material is Dow Polystyrene 666 which affords a suitable molecular weight.

One means for carrying out the invention is to dissolve the polymer in a non-reactive solvent such as a chlorinated aliphatic hydrocarbon, chlorinated aromatic hydrocarbon, an aromatic hydrocarbon, or an aliphatic hydrocarbon such as carbon tetrachloride, dichloroethane, chlorobenzene, toluene, cyclohexane, pentane, isopentane, hexane, isohexane or heptane. The preferred solvents are the lower boiling aliphatic hydrocarbons. A sulfonating agent is added to the solution of the polymer and nonreactive solvent at a temperature of about $-10°$ C. to about 100° C. for a period of time of about 1 to about 60 minutes, most preferably at room temperature for about 5 to about 45 minutes, and most preferably about 15 to about 30. Typical sulfonating agents are described in U.S. Pat. Nos. 3,642,728 and 3,836,511, previously incorporated herein by reference. These sulfonating agents are selected from an acyl sulfate, a mixture of sulfuric acid and an acid anhydride or a complex of a sulfur trioxide donor and a Lewis base containing oxygen, sulfur or phosphorous. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiophene, or triethylphosphate. The most preferred sulfonation agent for the invention is an acyl sulfate selected from the group consisting essentially of benzoyl, acetyl, propionyl or butyryl sulfate. The acyl sulfate can be formed in situ in the reaction medium or preformed in a chlorinated aliphatic or aromatic hydrocarbon or in the absence of solvent.

It should be pointed out that neither the sulfonating agent nor the manner of sulfonation is critical, provided that the sulfonating method does not degrade the polymer backbone. The reaction is quenched with an aliphatic alcohol such as methanol, ethanol, isopropanol, an aromatic hydroxyl compound, such as phenol, a cycloaliphatic alcohol such as a cyclohexanol, or water. The acid form of the sulfonated elastomeric polymer has about 10 to about 60 meq. $SO_3H$ groups per 100 grams of sulfonated polymer, more preferably about 15 to about 50, and most preferably about 20 to about 40. The meq. of $SO_3H/100$ grams of polymer is determined by both titration of the polymeric sulfonic acid and Dietert Sulfur analysis. In the titration of the sulfonic acid the polymer is dissolved in a solvent consisting of 95 parts of toluene and 5 parts of methanol at a concentration level of 50 grams per liter of solvent. The acid form is titrated with ethanolic sodium hydroxide to an Alizarin-Thymolphthalein endpoint.

Neutralization of the acid form of the sulfonated polymer is done, for example, by the addition of a solution of neutralizing agent such as a metal acetate or ammonium bases or amines such as ammonium acetate to the acid form of the sulfonated elastomeric polymer dissolved in the mixture of the aliphatic alcohol and non-reactive solvent. The metal acetate is dissolved in a binary solvent system consisting of water and/or aliphatic alcohol. Typically, but non-limiting metal acetates are sodium acetate, ammonium acetate, barium acetate, magnesium acetate, aluminum acetate, potassium acetate, lead acetate, and zinc acetate, wherein zinc acetate is preferred. The cation of the neutralized sulfonated polymer is selected from the group comprising iron, antimony, lead or Groups IA, IIA, IB or IIB of the Periodic Table of Elements. Typical amines are the simpler lower molecular weight amines such as methylamine, ethylamine, butylamine, dimethylamine, trimethylamine, cyclohexylamine, piperidine and aniline.

Sufficient neutralizing agent is added to the solution of the acid form of the elastomeric polymer to effect neutralization of the $SO_3H$ groups. It is preferable to neutralize at least 95% of the acid groups, more preferably about 98%, most preferably 100%.

The resultant neutralized sulfonated polymer has a melt viscosity which is dependent upon the molecular weight of the base polymer, the level of sulfonation, and the associated cation. An EPDM with an original Mooney viscosity (ML, 1+8, 212° F.) of about 55, containing about 40 meq. sulfonate/100 g EPDM and possessing cations such as mercury, magnesium, calcium, cobalt, lithium, barium, sodium and the like may disintegrate in a capillary rheometer at 200° C. at a shear rate of 0.73 sec$^{-1}$ and still possess at this shear rate an apparent viscosity in excess of $5 \times 10^6$ poise. An EPDM with an original Mooney viscosity (ML, 1+8, 212° F.) of about 20, containing about 30 meq. sulfonate/100 EPDM, and possessing cations such as zinc, lead, and ammonium possesses an apparent viscosity of from about $10^6$ to about $3.5 \times 10^6$ poise at a shear rate of 0.73 sec$^{-1}$ at 200° C. Lower sulfonate contents with amine salts result in apparent viscosities below $1 \times 10^6$ poise under the same testing conditions.

On the other hand the physical properties of the unplasticized sulfonated and neutralized polymers improve with increasing sulfonate content. Further metallic cations provide better physical properties than the amine cations. Good development of physical properties usually starts to occur when about 20 meq. sulfonate/100 polymer are present, and the physical properties obtained at 30 meq. sulfonate/100 polymer and higher are preferred. However, even at these higher levels of sulfonate the unplasticized neutralized sulfonated polymers still possess relatively modest physical properties, and the melt viscosities are so high that mixing or processing these gums in the absence of a plasticizer on conventional equipment is extremely difficult if not impossible.

U.S. Pat. No. 3,847,854 addressed itself to the problem of melt processability in metal sulfonate containing elastomers and a large number of materials are claimed as plasticizers that would give the ionomers lower melt viscosities at processing temperatures and thereby permit melt fabrication. However, many of the materials listed are relatively poor flow improvers. This patent also failed to recognize that not only is the functional group of the plasticizer critical in determining its effectiveness but also that the radical or substituent carrying the functional group also is very important.

Further U.S. Pat. No. 3,847,854 teaches that the effective flow improvers have an adverse effect on physical properties and therefore cautions against the use of more than 6-7 wt. % of a non-volatile plasticizer above which improvement in melt flow was taught to be associated with a consequent loss in physical properties.

The melt viscosities of the system can be determined through the use of an Instron Capillary rheometer. The melt viscosity measurements are typically made at a temperature of 200° C. and at various shear rates corresponding to crosshead speeds from 0.0005 in/min to 20 in/min. The apparent viscosity at 200° C. and at a shear rate of 0.73 sec$^{-1}$ (0.005 in/min) is employed as a characterization parameter of this invention. In addition to the capillary rheometer determinations, measures of melt viscosity can be obtained by determining the melt index at 190° C., generally at 250 psi. Materials possessing a melt index under these conditions of about 0.2 grams/10 min or greater can be considered mixable with plasticizers, fillers, extender oils, and other additives in high intensity, high shear rate mixers. Materials can be considered to be extrudable or injection moldable when they possess a melt index under these conditions of about 5 grams/10 minutes and greater.

It has been found that among a large number of non-volatile functional organic compounds that certain critically selected N-substituted organic carbamates result in the combination of markedly improved flow properties and at the same time an extraordinary improvement in physical properties for the sulfonated elastomeric compositions. Contrary to the teachings of U.S. Pat. No. 3,847,854 these selected N-sbustituted organic carbamates exert beneficial tensile property improvements at use temperature in addition to improvements in melt flow with increasing carbamate level at concentrations far beyond 6-7 parts by weight of carbamate/100 polymer. In fact, maximum physical property development generally occurs at carbamate concentrations of about 10 to about 30 parts by weight of carbamate.

The N-substituted carbamates have the general formula selected from the group comprising:

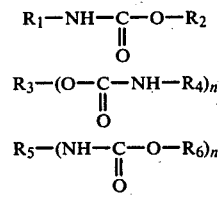

wherein $R_1$, and $R_2$ are normal or branched chain alkyl, cycloalkyl, aryl, alkaryl, or arylalkyl groups such as ethyl, butyl, octadecyl, behenyl, and dodecylphenyl and $R_4$, $R_6$ and either $R_1$ or $R_2$ must be a long chain, preferably linear saturated group containing from about 10 to about 50 carbon atoms, more preferably about 12 to about 40 carbon atoms and most preferably about 14 to about 30 carbon atoms; $R_3$ and $R_5$ are di-, tri-, or tetrafunctional aliphatic, cycloaliphatic, aryl, or alkaryl groups, m is 2, 3 or 4; and n is 2, 3 or 4. The most preferred mono carbamates

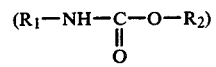

are those which contain two such long chain saturated, linear alkyl groups, for example, n-octadecyl octadecyl carbamate. The mono carbamates are prepared by the reaction of an aliphatic organic alcohol with an aliphatic isocyanate in an aliphatic hydrocarbon in the presence of an organo tin catalyst as exemplified typically by Example 1 of the instant application.

The polycarbamates of the instant invention are prepared by the reaction of polyisocyanates and alcohols or by the reaction of polyols and mono isocyanates. Examples of polyisocyanates which typically can be used, but these examples are not limiting in scope, are: 1,6-hexamethylene diisocyanate, tolylene-2,4-diisocyanate, methylene-di-p-phenyl diisocyanate or m-phenylene diisocyanate. Typical examples of polyols, but these examples are not limiting in scope, are 1,4-butanediol, 1,2,4-butanetriol, 1,4-cyclohexane dimethanol, glycerine, pentaerythritol, tetraethylene glycol, triethanol amine.

The N-substituted carbamates are incorporated into the metal or ammonium neutralized sulfonated polymer at a concentration level of about 1 to about 75 parts by weight per 100 parts of neutralized sulfonated polymer, more preferably at about 7 to about 50 and most preferably at about 10 to about 30. The N-substituted organic carbamate can be added to the cement of the neutralized sulfonated polymer prior to steam stripping. Alternatively, the neutralized sulfonated polymer can be redissolved in an organic solvent such as a 95/5 mixture of a hydrocarbon and an alcohol wherein the hydrocarbons are selected from the group comprising heptane, hexane, isopentane, benzene or toluene and the alcohol is methanol, ethanol or propanol to reform a cement of the neutralized sulfonated polymer; wherein the N-substituted organic carbamate is added to the cement of the neutralized sulfonated polymer which is subsequently steam stripped. Alternatively, the neutralized sulfonated polymer can be compounded with the N-substituted organic carbamate in an intensive mixer such as a Banbury, extruder, two roll mill or in a Farrell Continuous mixer.

Various chemical additives can be added directly to the cement of the neutralized sulfonated polymer or alternatively compounded into the gum of the neutralized sulfonated polymer in an intensive mixer to form blend compositions. Typical, but non limiting examples of chemical additives are selected from the group comprising oils, inorganic fillers, reinforcing agents, waxes, polyolefinic resins, or pigments and mixtures thereof.

The fillers employed in the present invention are selected from talcs, ground calcium carbonate, water precipitated calcium carbonate, or delaminated, calcined or hydrated clays and mixtures thereof. These fillers are incorporated into the blend composition at about 25 to about 300 parts by weight per hundred parts of the neutralized sulfonated polymer, more preferably at about 25 to about 250 and most preferably at about 25 to about 200. Typically, these fillers have a particle size of about 0.03 to about 20 microns, more preferably about 0.5 to about 10. The oil absorption as measured by grams of oil absorbed by 100 grams of filler is about 10 to about 100, more preferably about 10 to about 85 and most preferably about 10 to about 75. Typical fillers employed in this invention are illustrated in Table I.

TABLE I

| Filler | Code # | Oil Absorption grams of oil/100 grams of filler | Specific Gravity | Avg. Particle Size Micron | pH |
|---|---|---|---|---|---|
| Calcium carbonate ground | Atomite | 15 | 2.71 | | 9.3 |
| Calcium carbonate precipitated | Purecal U | 35 | 2.65 | .03–.04 | 9.3 |
| Delaminated clay | Polyfil XB | 30 | 2.61 | 4.5 | 6.5–7.5 |
| Hydrated clay | Suprex | | 2.6 | 2 | 4.0 |
| Calcined clay | Icecap K | 50–55 | 2.63 | 1 | 5.0–6.0 |
| Talc magnesium silicate | Mistron Vapor | 60–70 | 2.75 | 2 | 9.0–7.5 |

The oils employed in the present invention are non-polar process oils having less than about 2 wt. % polar type compounds as measured by molecular type clay gel analysis. These oils are selected from paraffinics ASTM Type 104B as defined in ASTM-D-2226-70, aromatics ASTM Type 102 or naphthenics ASTM Type 104A, wherein the oil has a flash point by the Cleveland open cup of at least 350° F., a pour point of less than 40° F., a viscosity of about 70 to about 3000 ssu's at 100° F. and a number average molecular weight of about 300 to about 1000, and more preferably about 300 to 750. The preferred process oils are paraffinics. Table II illustrates typical oils encompassed by the scope of this invention.

The oils are incorporated into the blend composition at a concentration level of about 20 to about 200 parts by weight per hundred parts of the neutralized sulfonated polymer; more preferably at about 20 to about 175, and most preferably at about 25 to about 150.

TABLE II

| Type Oil | Oil Code # | Viscosity ssu | $M_n$ | % Polars | % Aromatic | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |

Various other additives can be incorporated into the blend compositions to improve the physical properties, the appearance, the chemical properties of the formed elastomeric article or to modify the processability of the blend compositions.

A crystalline polyolefinic thermoplastic can be incorporated into the blend composition in minor proportions as a means for modification of the rheological properties of the blend compositions as well as the stiffness of the elastomeric article. Typically, the crystalline polyolefinic thermoplastic is added to the blend composition at a concentration level of about 0 to about 100 parts per hundred by weight based on 100 parts of sulfonated polymer, more preferably at about 0 to about 75; and most preferably at about 0 to about 50.

The crystalline polyolefin is characterized as a polymer of an alpha-olefin having a molecular weight of at least 2,000, preferably at least 10,000, and more preferably at least 20,000. This material comprises substantially an olefin but may incorporate other monomers, for example, vinyl acetate, acrylic acid, methyl acrylate, ethyl acrylate, sodium acrylate, methyl methacrylate, ethyl methacrylate, methacrylic acid, sodium methacrylate, etc. The preferred polyolefins are selected from the group consisting of polymers of $C_2$ to $C_4$ alpha olefins. Most preferably, the polyolefins are selected from the group consisting of polyethylene, polybutene, polypropylene, and ethylene-propylene copolymers. It is critical that the crystalline polyolefin have a degree of crystallinity of at least 25% and most preferably at least 40%.

Both high and low density polyethylene are within the scope of the instant invention. For example, polyethylenes having a density from 0.90 to 0.97 gms/cc are generally included. Polypropylene polymers having intermediate and high densities are the preferred examples of the polypropylene materials useful in the instant invention. These materials will have a density from 0.88 to 0.925 gms/cc. The polyethylene or polypropylene can also be combined as copolymers thereof so long as adequate crystallinity is obtained in said combination. Thus, block copolymers wherein polyethylene or polypropylene is present in crystalline form are effective.

Zinc oxide can be incorporated into the blend as a whitening pigment. The zinc oxide is incorporated into the blend composition at a concentration level of about 0 to about 25 parts per hundred by weight based on 100 parts of sulfonated polymer, more preferably about 0 to about 15. Alternatively, a Rutile or Anatase titanium dioxide can be employed as a whitening pigment.

A metallic hydroxide can be incorporated into the blend composition as a means of further neutralizing any residual free acid in the elastomeric compositions. The metallic hydroxide is incorporated at a concentration level of about less than 5.0 parts per hundred based on 100 parts of the neutralized sulfonated polymer, wherein the metal ion of the metallic hydroxide is selected from Group IIA of the Periodic Table of Elements such as barium, calcium or magnesium.

A lubricant can be employed in the blend composition at a concentration level of about 0 to about 20 parts per hundred based on 100 parts of the neutralized sulfonated polymers, and more preferably about 0 to about 15. The lubricants of the present instant invention are non-polar paraffinic hydrocarbon waxes having a softening point of about 135° F. to about 220° F., more preferably 150° F. to 200° F., wherein the wax has a number average molecular weight of about 1000 to about 4000, more preferably 1500 to 3500, and less than about 2 wt. % polar constituents. These lubricants modify the rheological properties of the composition, improve the processability in forming the elastomeric or thermoplastic article and impart a shine or gloss to the elastomeric article. Additionally, amorphous polypropylene can be used as a lubricant.

Additionally, reinforcing fillers can be added as additives to the blends of sulfonated polymer, filler and oil, wherein the reinforcing filler is selected from the group consisting essentially of silica, carbon black, or calcium silicate and mixtures therein. These reinforcing agents are generally characterized as having particle sizes below 0.1 microns and oil absorption above about 100. These reinforcing fillers are incorporated in the blend composition at about 0 to 50 parts per hundred based on 100 parts of sulfonated polymer, more preferably 0 to 25.

DETAILED DESCRIPTION

The advantages of both the rheological and physical properties of the blend compositions of the present invention can be more readily appreciated by reference to the following examples and tables. Unless otherwise specified, all measurements are in parts per hundred by weight.

EXAMPLE 1—PREPARATION OF N-BUTYL OCTADECYL CARBAMATE

To a clean and dry 100 ml 4-necked round bottom flask was charged 250 ml. of fresh, dry hexane, 67.6 g. (0.25 mole) of octadecanol, and 0.1 g. of dibutyl tin dilaurate. The flask was fitted with a stirrer, reflux condenser, and thermowell. The flask was heated to 50° C. and a clear solution resulted. Then a solution of 24.8 g. (0.25 mole) of butyl isocyanate in 25 ml. hexane in a 100-ml beaker was added all at once. The beaker was rinsed with an additional 25 ml. hexane. An exotherm occurred which was controlled through the wet ice cooling of the flask. Temperature was maintained at 50° C. for 60 minutes. Solid products precipitated when the reactants were cooled to room temperature, and the precipitated solid was collected by filtration and then air dried. Eighty-two grams of product was recovered. It had a melting point of 68° C. when taken with a Nalge melting point apparatus.

EXAMPLE 2—PREPARATION OF N-OCTADECYL ETHYL CARBAMATE

The procedure of Example 1 was followed except that 11.5 g. (0.25 mole) of absolute ethanol and 73.9 g (0.25 mole) of octadecyl isocyanate were used. The collected product weighed 57.0 g. and had a melting point of 61° C.

EXAMPLE 3—PREPARATION OF N-OCTADECYL OCTADECYL CARBAMATE

The procedure of Example 1 was followed except that 67.8 g. (0.25 mole) of octadecanol, 73.9 g. (0.25 mole) of octadecyl isocyanate, and 500 ml. hexane were used. The collected and air dried product weighed 132.0 g. and had a melting point of 84° C.

EXAMPLE 4

The three carbamates described above in Examples 1–3 and the starting materials, octadecanol and octadecyl isocyanate, were solution blended with a zinc sulfonate containing EPDM with about 30 meq. sulfonate/100 polymer and about 55 wt. % ethylene in the backbone, which was prepared according to the procedure of U.S. Ser. No. 855,701 which is incorporated herein by reference. The starting polymer had a Mooney viscosity (ML, 1+8, 212° F.) of about 20. The plasticizers were added at levels of 10, 20, and 30 parts/100 polymer by dissolving the unplasticized gum in 95 toluene/5 methanol at a concentration of 100 g./liter and stripping the resultant solutions or dispersions. The wet crumbs of the plasticized polymers were dried on a rubber mill at about 220° F. Melt index at 190° C. and 250 psi and tensile properties at both room temperature and at 70° C. were determined for each of the blends. The results are given in Table III.

Octadecyl isocyanate does lower melt viscosity significantly; however, tensile properties suffer, especially at 70° C. Octadecanol does not appreciably lower melt viscosity and yet tensile properties suffer, just as with octadecyl isocyanate. It is important to have this comparative data to ascertain whether any improvements seen with the carbamates are due to impurities from hydrolysis products.

N-octadecyl ethyl carbamate reduces melt viscosity and provides retention of room temperature tensile properties; however, 70° C. tensile properties suffer.

N-butyl octadecyl carbamate exerted a more modest decrease in melt viscosity; however, it did improve room temperature tensile properties, although 70° C. tensile properties were adversely affected.

The N-octadecyl octadecyl carbamate exerted a modest effect upon viscosity reduction; however, this material showed a substantial retention of the 70° C. tensile strength over the unplasticized gum and a substantial improvement in room temperature tensile properties.

These data show that carbamates of the proper construction are ionic domain plasticizers which provide for simultaneous improved melt flow and improved tensile properties.

TABLE III

| Plasticizer | Concentration Parts 100 Polymer | Melt Index (190° C. 250 psi), g/10 minutes | Room Temperature 300% Modulus, psi | Room Temperature Tensile Strength, psi | Room Temperature Elong., % | 70° C. 300% Modulus, psi | 70° C. Tensile Strength, psi | 70° C. Elong., % |
|---|---|---|---|---|---|---|---|---|
| None | 0 | 0 | 970 | 3530 | 510 | 680 | 920 | 390 |
| Octadecylisocyanate | 10 | 0.18 | 730 | 3530 | 500 | 100 | 70 | 750 |
|  | 20 | 1.5 | 600 | 3080 | 530 | 30 | 15 | 350 |
|  | 30 | 3.4 | 360 | 2070 | 590 | 15 | 10 | 330 |
| Octadecanol | 10 | 0 | 770 | 3420 | 490 | 130 | 160 | 470 |
|  | 20 | 0.08 | 870 | 3540 | 490 | 15 | 5 | 600 |
|  | 30 | — | 790 | 2945 | 490 | 5 | 5 | 370 |
| N-Octadecyl Ethyl Carbamate | 10 | 0.08 | 640 | 2830 | 500 | 180 | 300 | 610 |
|  | 20 | 0.67 | 700 | 3600 | 550 | 60 | 40 | 790 |
|  | 30 | 1.4 | 670 | 3220 | 540 | — | 20 | 270 |
| N-Butyl Octadecyl Carbamate | 10 | 0.09 | 780 | 5060 | 520 | 170 | 250 | 550 |
|  | 20 | 0.39 | 730 | 4950 | 540 | 60 | 40 | 610 |
|  | 30 | 0.76 | 720 | 3930 | 500 | — | 10 | 260 |
| N-Octadecyl Octadecyl Carbamate | 10 | 0.05 | 930 | 5900 | 500 | 310 | 760 | 610 |
|  | 20 | 0.21 | 760 | 5430 | 535 | 200 | 500 | 690 |
|  | 30 | 0.73 | 810 | 5140 | 520 | 190 | 445 | 710 |

What is claimed is:

1. A polymeric composition including:
   (a) a neutralized sulfonated polymer having 15 to about 50 meq. neutralized sulfonate groups per 100 grams of said sulfonated polymer, said neutralized sulfonate groups containing metal, ammonium or amine cations; and
   (b) about 1 to about 75 parts by weight of an N-substituted organic carbamate per 100 parts said neutralized sulfonated polymer said N-substituted organic carbamate having the formula selected from the group consisting of

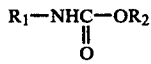

wherein $R_1$ and $R_2$ are normal or branched chain alkyl, cycloalkyl, aryl, alkaryl, or arylalkyl groups, either $R_1$ or $R_2$ must be a long chain alkyl group having about 10 to about 50 carbon atoms,

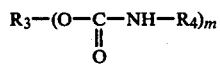

wherein m is 2, 3 or 4, $R_4$ is a long chain, linear saturated alkyl group having about 10 to about 50 carbon atoms and $R_3$ is a di-, tri-, or tetrafunctional aliphatic, cycloaliphatic, aryl, or alkaryl group, and

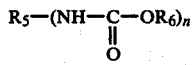

wherein n is 2, 3 or 4, $R_6$ is a long chain, linear saturated alkyl group having 10 to about 50 carbon atoms and $R_5$ are di-, tri-, or tetrafunctional aliphatic, cycloaliphatic, aryl, or alkylaryl groups.

2. A composition according to claim 1, wherein said neutralized sulfonated polymer is formed from an elastomeric polymer selected from the group consisting of Butyl rubber and an EPDM terpolymer.

3. A composition according to claim 2, wherein said EPDM terpolymer consists essentially of about 40 to about 80 wt. % of ethylene, of about 10 to about 53 wt. % of propylene and of about 1 to about 10 wt. % of a non-conjugated diene.

4. A composition according to claim 3, wherein said non-conjugated diene is selected from the group consisting of 1,4-hexadiene, dicyclopentadiene, alkylidene substituted norbornenes, alkenyl substituted norbornenes, and tetrahydroindene.

5. A composition according to claim 4, wherein said non-conjugated diene is 5-ethylidene-2-norbornene.

6. A composition according to claim 1, wherein said metal cation of said metal neutralized sulfonated polymer is selected from the group consisting of Groups IA, IIA, IB, IIB, lead, antimony and iron of the Periodic Table of Elements.

7. A composition according to claim 6, wherein said metal cation is zinc.

8. A composition according to claim 1, wherein said N-substituted organic carbamate has the formula:

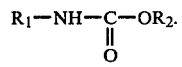

wherein $R_1$ and $R_2$ are normal or branched chain alkyl, cycloalkyl, aryl, alkaryl, or arylalkyl groups.

9. A composition according to claim 1, wherein said N-substituted organic carbamate has the formula:

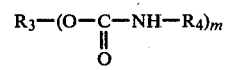

wherein m is 2, 3 or 4, $R_4$ is a long chain, linear saturated alkyl group having about 10 to about 50 carbon atoms and $R_3$ is a di-, tri-, or tetrafunctional aliphatic, cycloaliphatic, aryl, or alkaryl group.

10. A composition according to claim 1, wherein said $R_4$ has at least about 14 carbon atoms.

11. A composition according to claim 1, wherein said N-substituted organic carbamate has the formula:

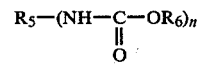

wherein n is 2, 3 or 4, $R_6$ is a long chain, linear saturated alkyl group having 10 to about 50 carbon atoms and $R_5$ are di-, tri-, or tetrafunctional aliphatic, cycloaliphatic, aryl, or alkylaryl groups.

12. A composition according to claim 1, wherein $R_6$ has at least about 14 carbon atoms.

13. A composition according to claim 1, further including a reinforcing filler at a concentration level of about less than 50 parts by weight per 100 parts of said neutralized sulfonated polymer.

14. A composition according to claim 1, further including a filler at a concentration level of less than about 300 parts by weight per 100 parts of said neutralized sulfonated polymer.

15. A composition according to claim 14, wherein said filler is selected from the group consisting of clay, talc, and calcium carbonate, and mixtures thereof.

16. A composition according to claims 1 or 14 further including a non-polar process oil at a concentration level of less than about 200 parts by weight per 100 parts of said neutralized sulfonated polymer.

17. A composition according to claim 16, wherein said non-polar process oil is selected from the group consisting of paraffinic, naphthenic and aromatics and mixtures thereof.

18. A composition according to claim 15, further including a non-polar process oil at a concentration level of less than about 200 parts by weight per 100 parts of said neutralized sulfonated polymer.

19. A composition according to claim 18, wherein said non-polar process oil is selected from the group consisting of paraffinic, naphthenic, and aromatics and mixtures thereof.

20. A composition according to claim 1, further including a crystalline polyolefinic thermoplastic.

21. A composition according to claim 20, wherein said polyolefinic thermoplastic is added at a concentration level of less than about 100 parts per hundred by weight per 100 parts of said neutralized sulfonated polymer.

22. A composition of claim 1, further including a lubricant at a concentration level of less than about 20 parts by weight per 100 parts of said neutralized sulfonated polymer.

23. A composition of claim 22, wherein said lubricant is a crystalline hydrocarbon wax having a melting point of about 135° F. to about 220° F. and an $\overline{M}n$ of about 1000 to about 4000.

24. A composition according to claim 8, wherein either $R_1$ or $R_2$ has at least about 12 carbon atoms.

25. A composition according to claim 1 wherein said neutralized sulfonated polymer is formed from a thermoplastic polymer which is a polyvinyl aromatic thermoplastic resin.

26. A composition according to claim 1 wherein said neutralized sulfonated polymer is formed from polystyrene.

27. A composition according to claim 1 wherein said carbamate is at a concentration level of about 8 to about 50 parts by weight per 100 parts of said neutralized sulfonated polymer.

28. A composition according to claim 16 further including a crystalline polyolefinic thermoplastic.

29. A formed elastomeric article prepared from an elastomeric blend composition which includes
(a) 100 a neutralized sulfonated polymer having about 15 to about 60 meq. neutralized sulfonate groups per 100 grams of said neutralized sulfonated polymer, said neutralized sulfonate groups containing metal, ammonium or amine cations; and
(b) about 1 to about 75 parts by weight of an N-substituted organic carbamate based on 100 parts of said neutralized sulfonated polymer, said N-substituted organic carbamate having the formula selected from the group consisting of

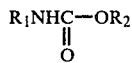

wherein $R_1$ and $R_2$ are normal or branched chain alkyl, cycloalkyl, aryl, alkaryl, or arylalkyl groups, either $R_1$ and $R_2$ must be a long chain alkyl group having about 10 to about 50 carbonatoms,

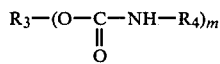

wherein m is 2, 3 or 4, $R_4$ is a long chain, linear saturated alkyl group having about 10 to about 50 carbon atoms and $R_3$ is a di-, tri- or tetrafunctional aliphatic, cycloaliphatic, aryl, or alkaryl group, and

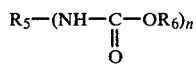

wherein n is 2, 3 or 4, $R_6$ is a long chain, linear saturated alkyl group having 10 to about 50 carbon atoms and $R_5$ are di-, tri-, or tetrafunctional aliphatic, cycloaliphatic, aryl, or alkylaryl groups.

30. An elastomeric article according to claim 29, wherein said neutralized sulfonated polymer is formed from an elastomeric polymer selected from the group consisting of Butyl rubber and an EPDM terpolymer.

31. An elastomeric article according to claim 30, wherein said EPDM terpolymer consists essentially of about 40 to about 80 wt. % of ethylene, of about 10 to about 53 wt. % of propylene and of about 1 to about 10 wt. % of a nonconjugated diene.

32. An elastomeric article according to claim 31, wherein said non-conjugated diene is selected from the group consisting of 1,4-hexadiene, dicyclopentadiene, alkylidene substituted norbornenes, alkenyl substituted norbornenes and, tetrahydroindene.

33. An elastomeric article according to claim 32, wherein said non-conjugated diene is 5-ethylidene-2-norbornene.

34. An elastomeric article according to claim 29, wherein said metal cation of said metal neutralized solution polymer is selected from the group consisting of Groups IA, IIA, IB, IIB, lead, antimony and iron of the Periodic Table of Elements.

35. An elastomeric article according to claim 34, wherein said metal cation is zinc.

36. An elastomeric article according to claim 29, wherein said N-substituted organic carbamate has the formula:

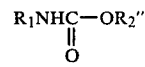

wherein $R_1$ and $R_2$ are normal or branched chain alkyl, cycloalkyl, aryl, alkaryl, or arylalkyl groups.

37. An elastomeric article according to claim 29, wherein said N-substituted organic carbamate has the formula:

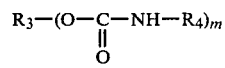

wherein m is 2, 3 or 4, $R_4$ is a long chain, linear saturated alkyl group having about 10 to about 50 carbon atoms and $R_3$ is a di-, tri-, or tetrafunctional aliphatic, cycloaliphatic, aryl, or alkaryl group.

38. An elastomeric article according to claim 29, wherein said $R_4$ has at least about 14 carbon atoms.

39. An elastomeric article according to claim 29, wherein said N-substituted organic carbamate has the formula:

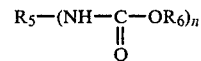

wherein n is 2, 3 or 4, $R_6$ is a long chain, linear saturated alkyl group having 10 to about 50 carbon atoms and $R_5$ are di-, tri-, or tetrafunctional aliphatic, cycloaliphatic, aryl, or alkylaryl groups.

40. An elastomeric article according to claim 29, wherein $R_6$ has at least about 14 carbon atoms.

41. An elastomeric article according to claim 29, further including a reinforcing filler at a concentration level of about less than 50 parts per hundred by weight per 100 parts of said neutralized sulfonated polymer.

42. An elastomeric article according to claim 29, further including a filler at a concentration level of less than about 300 parts by weight per 100 parts of said neutralized sulfonated polymer.

43. An elastomeric article according to claim 42, wherein said filler is selected from the group consisting of clay, talc, and calcium carbonate, and mixtures thereof.

44. An elastomeric article according to claims 29 or 42, further including a non-polar process oil at a concentration level of less than about 200 parts by weight per 100 parts of said neutralized sulfonated polymer.

45. An elastomeric article according to claim 44, wherein said non-polar process oil is selected from the group consisting of paraffinic, naphthenic and aromatics and mixtures thereof.

46. An elastomeric article according to claim 43, further including a non-polar process oil at a concentration level of less than about 200 parts by weight per 100 parts of said neutralized sulfonated polymer.

47. An elastomeric article according to claim 46, wherein said non-polar process oil is selected from the group consisting of paraffinic, naphthenic and aromatics and mixtures thereof.

48. An elastomeric article according to claim 29, further including a crystalline polyolefinic thermoplastic.

49. An elastomeric article according to claim 48, wherein said polyolefinic thermoplastic is added at a concentration level of less than about 100 parts by weight per 100 parts of said neutralized sulfonated polymer.

50. An elastomeric article according to claim 29, further including a lubricant at a concentration level of less than about 20 parts by weight per 100 parts of said neutralized sulfonated polymer.

51. An elastomeric article according to claim 50, wherein said lubricant is a crystalline hydrocarbon wax having a melting point of about 135° F. to about 220° F. and an $\overline{M}n$ of about 1000 to about 4000.

52. An elastomeric article according to claim 36, wherein either $R_1$ or $R_2$ has at least about 12 carbon atoms.

53. An elastomeric article according to claim 29, wherein said neutralized sulfonated polymer is formed from a thermoplastic polymer which is a polyvinyl aromatic thermoplastic resin.

54. An elastomeric article according to claim 29, wherein said neutralized sulfonated polymer is formed from polystyrene.

55. An elastomeric article according to claim 29, wherein said carbamate is at a concentration level of about 8 to about 50 parts by weight on 100 parts of said neutralized sulfonated polymer.

56. An elastomeric article according to claim 44, further including a crystalline polyolefinic thermoplastic.

* * * * *